Aug. 10, 1943.　　　V. R. MULLINS　　　2,326,385

CARTOGRAPHIC INSTRUCTION DEVICE

Filed Dec. 7, 1942

Inventor

V. R. Mullins,

By H. B. Willson & Co.

Attorneys

Patented Aug. 10, 1943

2,326,385

UNITED STATES PATENT OFFICE 2,326,385

CARTOGRAPHIC INSTRUCTION DEVICE

Virgil R. Mullins, Swayzee, Ind.

Application December 7, 1942, Serial No. 468,149

3 Claims. (Cl. 35—43)

The invention relates to cartographic equipment, principally for classroom instruction, and it aims to provide a novel device in which the surface of a hemispherical member constitutes an accurate globe map of one hemisphere of the world, and in which sufficient flat gores for a corresponding globe map of the other hemisphere, radiate from the base circumference of said hemispherical body. Thus, with the single device, students may not only thoroughly study one hemisphere of the world but may be taught the principal problem of map projection, namely, the impossibility of spreading out a spherical surface upon a flat surface without such expedients as separating various areas from each other, stretching in some places and contracting in others. Thus, it may readily be taught that as the world is a sphere, the only accurate map of an extensive part of its area, must be upon a spherical surface, and that any map of such an area on a single flat surface necessarily includes various compromises and distortions. This latter is made readily understandable by the fact that the map areas on the separate flat radiating gores, which map areas may be as accurate as possible on flat surfaces, could not be brought together and matched on a single flat surface to produce a complete map.

The developments in aeronautics and global warfare have recently compelled us to increase our geographical knowledge. The old geographical relationships were based on land and sea movements. Sea-going ships could not traverse the arctic seas and so we paid little attention to those areas surrounding these seas. Developments in air transportation, however, developments in air travel routes which follow as closely as possible the arcs of great circles, have made it necessary to teach new geographical relationships—relationships based on air routes. Peoples we have always heretofore regarded as very remote from us have rather suddenly become fairly close neighbors, certainly much closer to us than they were on the basis of sea travel, making it necessary that we learn the relationships of the various parts of the world in which these peoples live. For teaching such relationships, the invention is particularly adaptable, and while the half-globe map which it provides is shown as representing the northern hemisphere, and the radiating gores the southern, the reverse could be effected, or they could obviously represent the eastern and western or any other two hemispheres, if desired.

Figure 1:
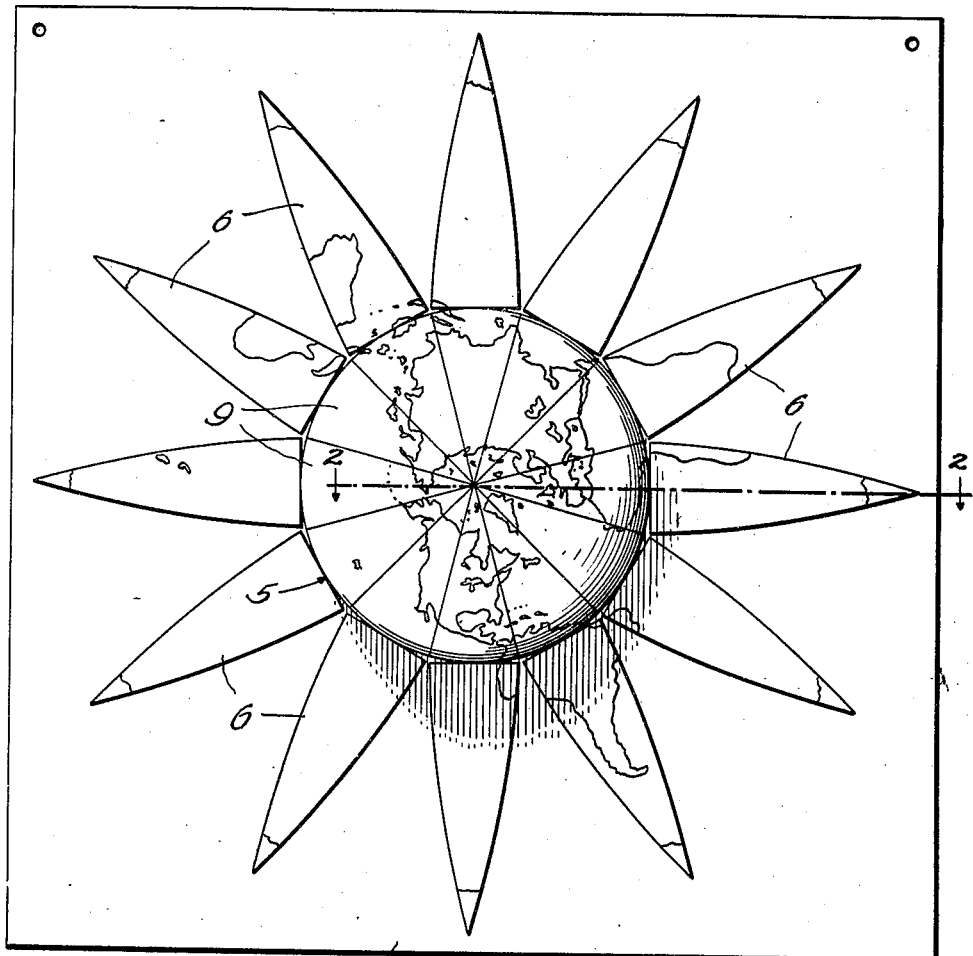

In Figure 1 of the accompanying drawing, I have illustrated a front elevation of a cartographic instruction device constructed in accordance with the invention, to be preferably hung upon a wall or otherwise supported in a vertical position.

Figure 2:
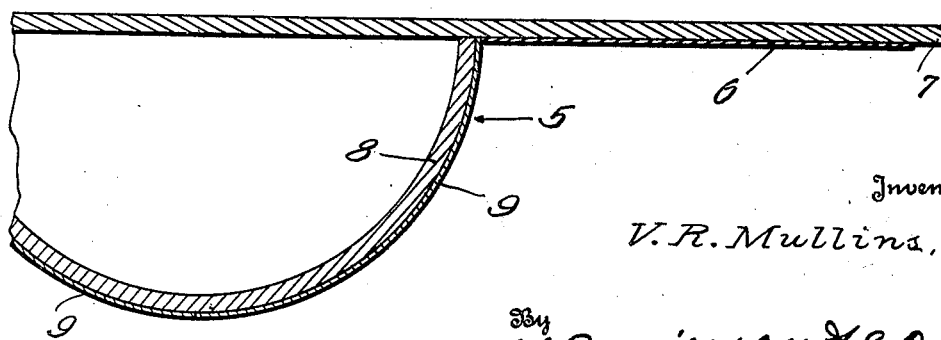

Figure 2 is an enlarged fragmentary horizontal section on line 2—2 of Fig. 1.

In the drawing above briefly described, the numeral 5 denotes a hemispherical member, the surface of which constitutes a globe map of one hemisphere of the earth, the northern hemisphere in the present disclosure. Radiating from the base circumference of the hemispherical member 5, are sufficient gores 6 for a globe map of the other hemisphere, the southern in the present disclosure. It is preferable that the gores 6 be actual cutout gores glued or otherwise secured upon the front of a single panel or board 7 which fixedly carries the hemispherical member 5. It is also preferable that this hemispherical member comprise a hemispherical body 8 secured to the board 7, and gores 9 glued or otherwise secured upon the surface of said body 8. As usual, the gores 9 are applied to the body 8 while they are wet with the glue or the like, enabling such stretching as is required to insure accurate fitting of the originally flat gores to the spherical surface. The gores 6, however, are not stretched or otherwise distorted when they are applied to the board or panel 7. While I have disclosed all of these gores 6 of full length, it will be obvious that some of them may have their outer pointed ends cut off if desired, to make the use of a smaller board or panel possible. For example where the member 5 represents the northern hemisphere, there is very little of interest in the regions around the South Pole and by cutting off the tips of the gores 6 in such a device, a smaller board 7 may be employed.

From the foregoing taken in connection with the accompanying drawing, it will be seen that the invention provides a novel and advantageous cartographic device in which any desired hemisphere of the world may be accurately shown upon a half globe map, in which sufficient gores for a globe map of the other hemisphere are provided, and from which it may be readily understood that any attempt to provide, on a flat surface, a map of an extended area of the world's surface, must necessarily include various compromises and distortions. It will also be seen that the invention is of particular merit in the study of relationships of geographical divisions and political subdivisions, such study being essential due to developments in air transportation and global warfare.

While a preferred construction has been illustrated, variations may of course be made within the scope of the invention as claimed, and it will of course be understood that the gores 6 need not be actual cutout gores, but that they could simply be printed, lithographed or formed in some other suitable manner upon a suitable board or panel. In this regard, I am aware that the word "gore" means a tapered or triangular member of some sort, and a mere gore representation printed or otherwise formed upon a board or sheet, probably would not ordinarily fall within this meaning. Nevertheless, it is obvious that actual cutout gores and gore representations are equivalents insofar as the broad aspect of the present invention is concerned. Therefore, in the absence of a better generic term, I have used the word "gores" to mean either actual cutout gores or gore representations. In all cases, the map areas at the inner ends of the gores 6 should be in matching relation with those at the base circumference of the member 5, enabling the continuity of the map from one hemisphere to the other to be readily seen.

I claim:

1. A cartographic instruction device comprising a hemispherical member the surface of which constitutes a globe map of one hemisphere of the world, and sufficient map gores for a corresponding globe map of the other hemisphere of the world, said gores radiating from the base circumference of said hemispherical member, said hemispherical member and gores being so connected as to form a single unit, the map areas at the inner ends of said gores being in matching relation with the map areas at said base circumference of said hemispherical member.

2. A structure as specified in claim 1; said unit formed by said gores and said hemispherical member being rigid.

3. A cartographic instruction device comprising a hemispherical member the surface of which constitutes a globe map of one hemisphere of the world, sufficient cutout map gores for a corresponding globe map of the other hemisphere of the world, and a flat board on which said hemispherical member and cutout gores are mounted in fixed relation, said cutout gores radiating from the base circumference of said hemispherical member, the map areas at the inner ends of said gores being in matching relation with the map areas of said base circumference of said hemispherical member.

VIRGIL R. MULLINS.